United States Patent [19]

Ottersberg et al.

[11] 4,003,635
[45] Jan. 18, 1977

[54] MOSAIC INTERFERENCE FILTER

[75] Inventors: Walter H. Ottersberg, Floral Park; Michael T. Rubertone, New Hyde Park; Tarald H. Oigarden, Cold Spring Harbor, all of N.Y.

[73] Assignee: The United States of America as represented by the Secretary of the Navy, Washington, D.C.

[22] Filed: Mar. 27, 1968

[21] Appl. No.: 717,489

[52] U.S. Cl. .............................. 350/166; 350/318
[51] Int. Cl.[2] .......................................... G02B 5/28
[58] Field of Search .......... 350/311, 317, 318, 314, 350/315, 290, 166; 250/86; 244/3.16

[56] References Cited
UNITED STATES PATENTS

| 3,165,749 | 1/1965 | Cushner | 350/290 |
| 3,339,457 | 9/1967 | Pun | 244/3.16 |
| 3,410,626 | 11/1968 | Magrath | 350/317 |

*Primary Examiner*—Moskowitz, Nelson
*Attorney, Agent, or Firm*—G. J. Rubens; Henry Hansen

[57] ABSTRACT

A narrow-band interference filter is placed in the path of reflected optical energy for rejecting undesirable signals to thereby improve the signal-to-noise ratio. The interference filter functions as a bandpass filter having a center frequency centered around the frequency of the transmitted optical beam. The filter includes four identical quarter annulus sections, each composed of a mosaic of interference filter elements cemented to a glass substrate. Each substrate is itself positioned within a skeletal spider structure to provide the desired shape and rigidity.

4 Claims, 3 Drawing Figures

INVENTORS
WALTER H. OTTERSBERG
MICHAEL T. RUBERTONE
TARALD H. OIGARDEN

By
ATTORNEY

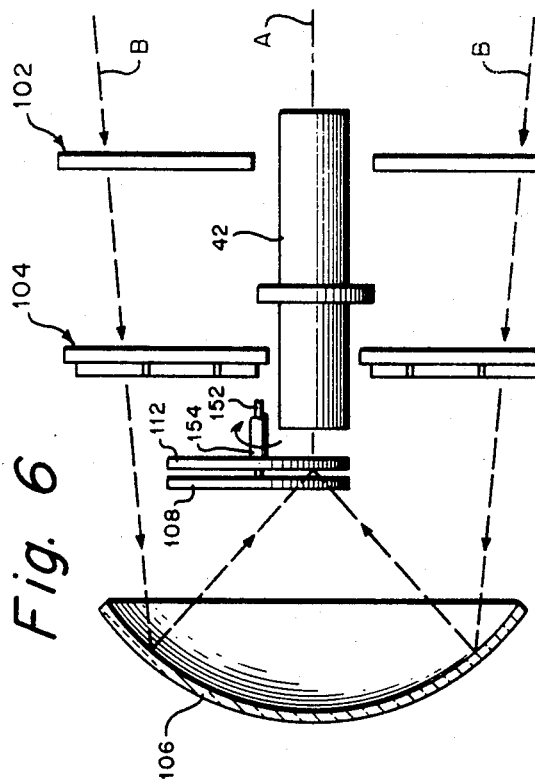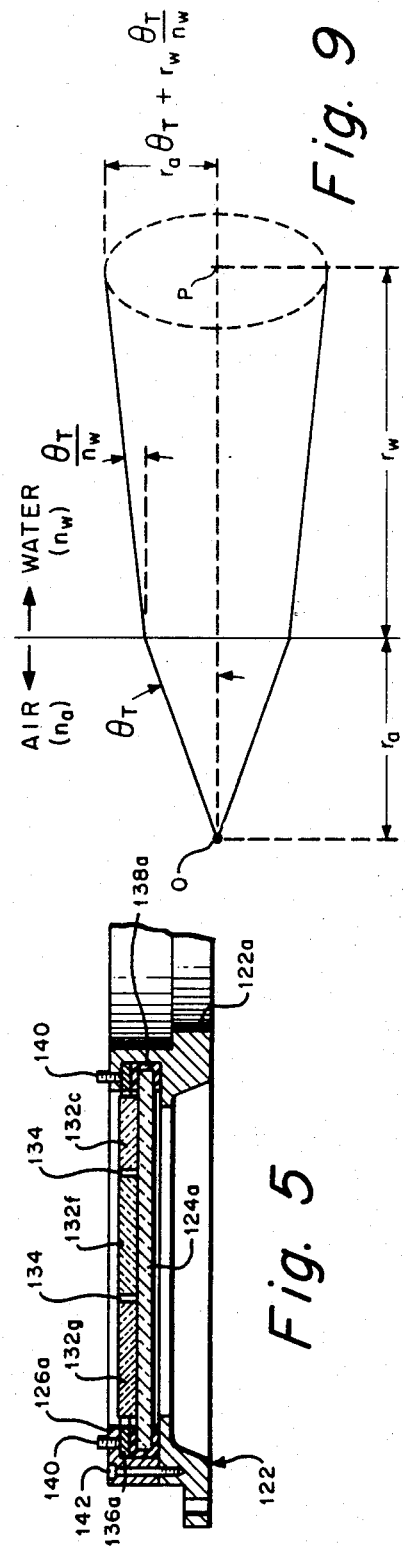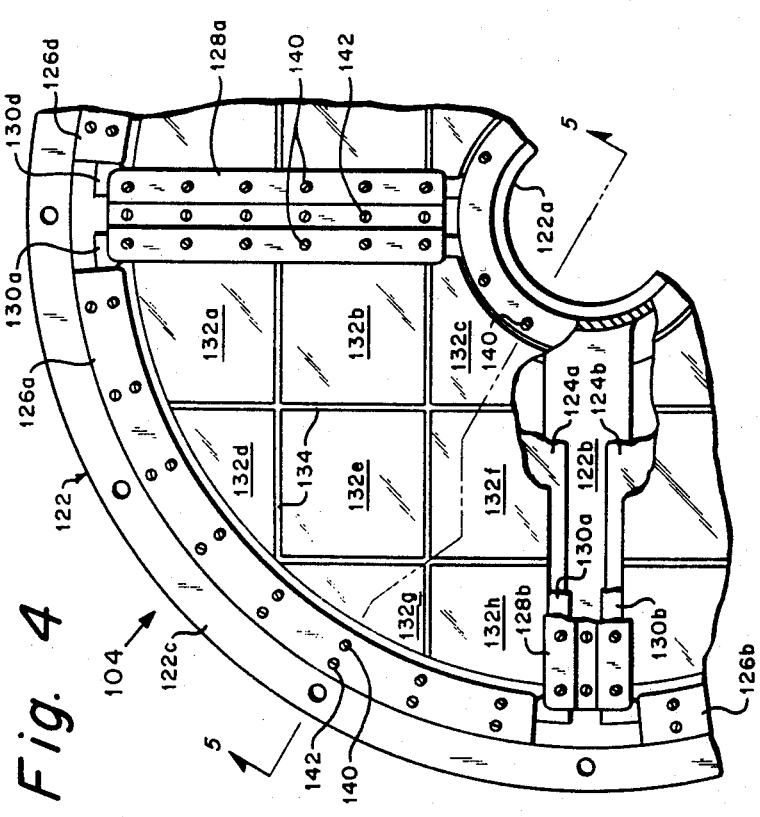

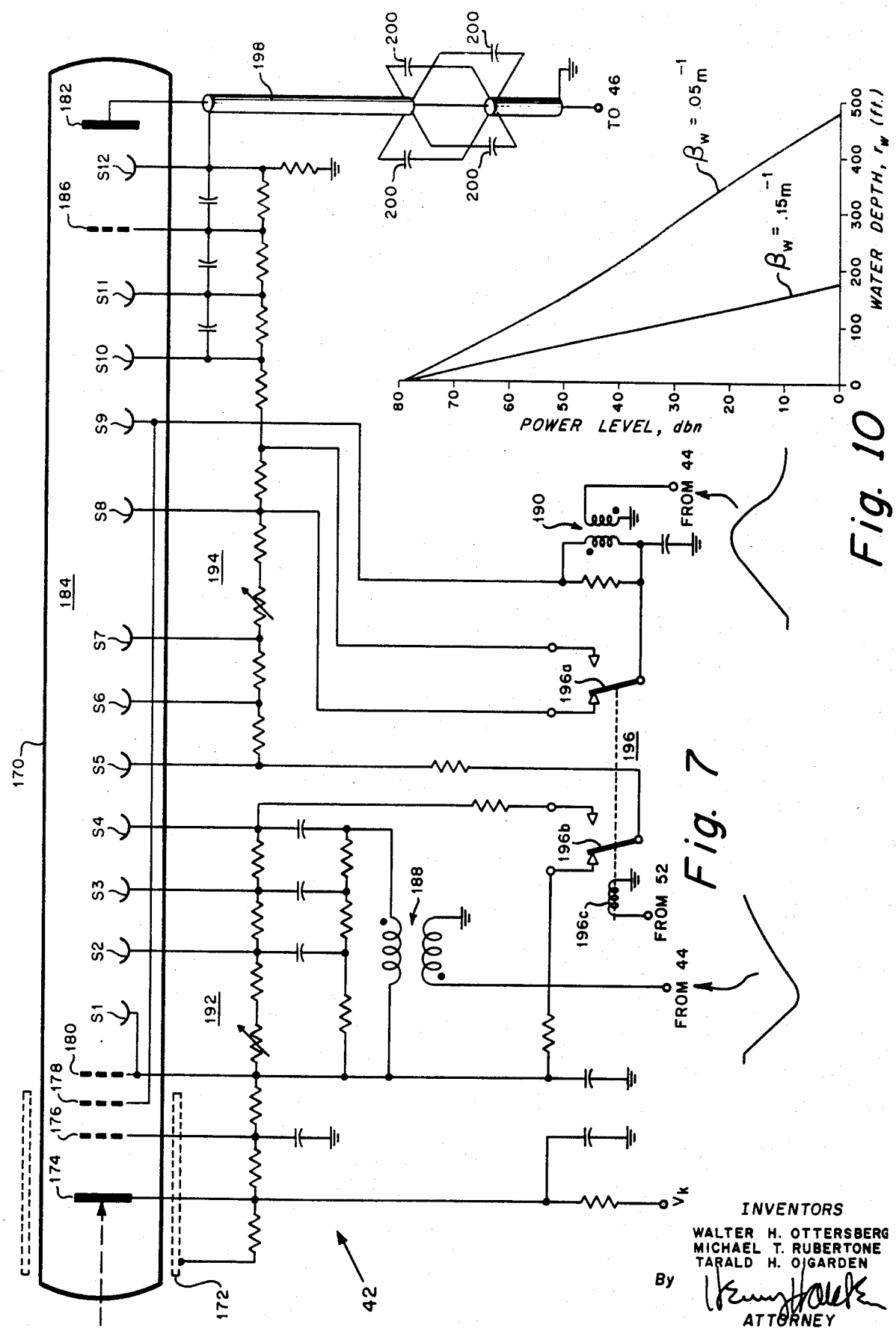

MOSAIC INTERFERENCE FILTER

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

In the field of antisubmarine warfare, various techniques including active and passive sonar devices and magnetic anomaly detection devices have been employed. The detection and ranging of underwater objects at extended ranges from an aircraft is now also possible through the use of optical energy ranging and detection systems. One of the problems associated with these systems, however, is the resultant relatively high signal-to-noise ratio produced by the systems' inability to discriminate between received, reflected energy which is merely noise (due, for example, to air-water interface conditions) and energy which is actual target information.

SUMMARY OF THE INVENTION

It is, therefore, the general purpose of the present invention to provide an interface filter for use in the receiving portion of an optical ranging and detecting system. More particularly, this invention relates to a mosaic interference filter positioned within (and as an integral part of) the collecting optics of an optical ranging and detecting system which may, in an exemplary embodiment, be a laser echo receiver. The mosaic filter functions as a bandpass filter having a center frequency centered about the frequency of the transmitted optical beam. In a laser echo receiver, for example, the filter may be placed forward of the focal plane of a low f number parabolic reflector, to provide a narrow acceptance band for reflected energy with a high percentage of transmission only at the center frequency. In this way the mosaic filter rejects undesirable signals and improves the overall signal-to-noise ratio.

The filter has a mosaic-type construction and provides a large aperture, narrow-band, filter for improvement of the signal-to-noise ratio of the receiver. The filter includes a plurality of interference filter segments in juxtaposed relationship, secured to a substrate, and positioned on an annular-shaped, four-vane spider member. The spider member has an aperture therein to accommodate the coaxial placement of a photomultiplier detector.

DESCRIPTION OF THE PREFERRED EMBODIMENT

Figure 1:
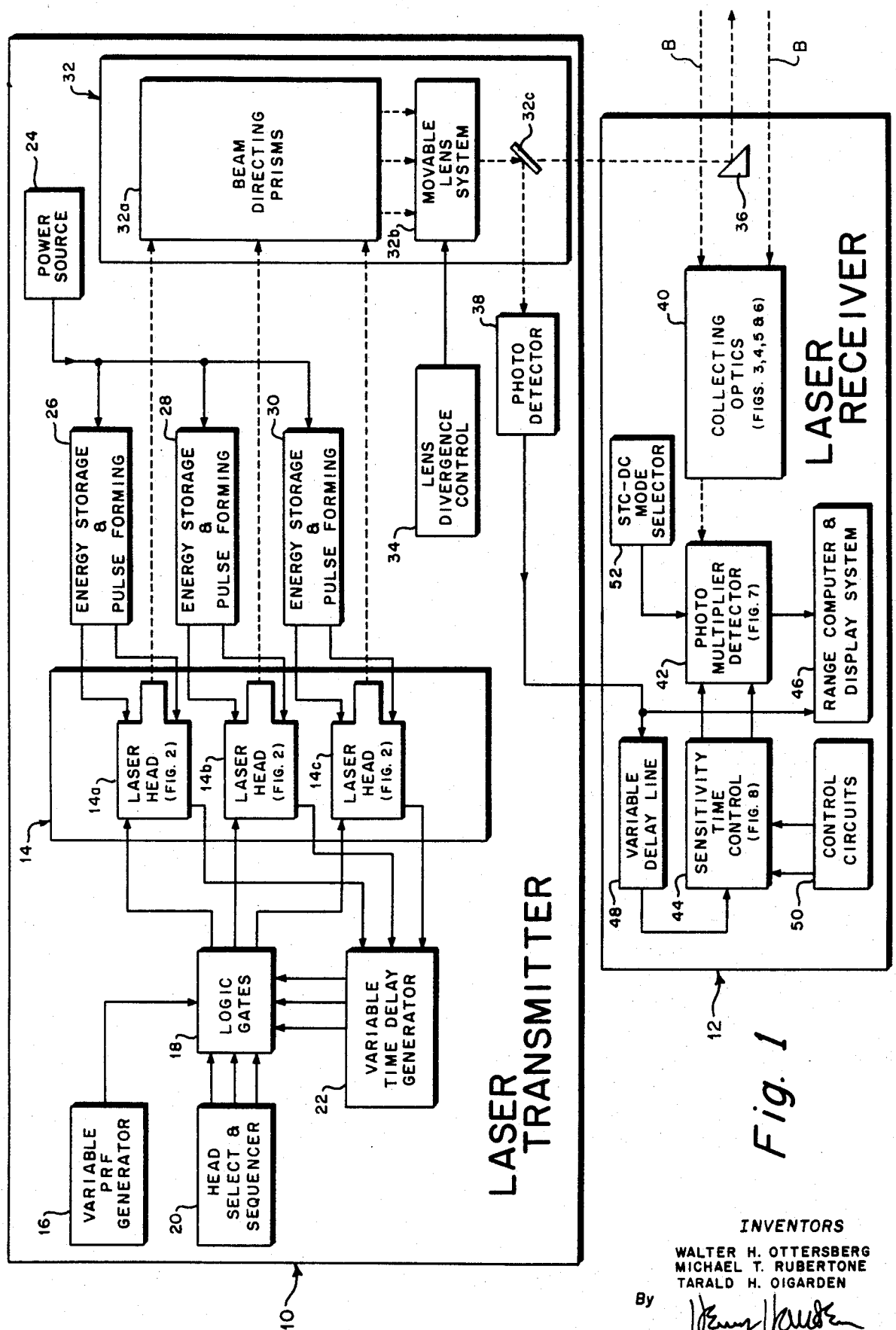
FIG. 1 is a quarter section plan view of the interference filter of the present invention.
Figure 2:
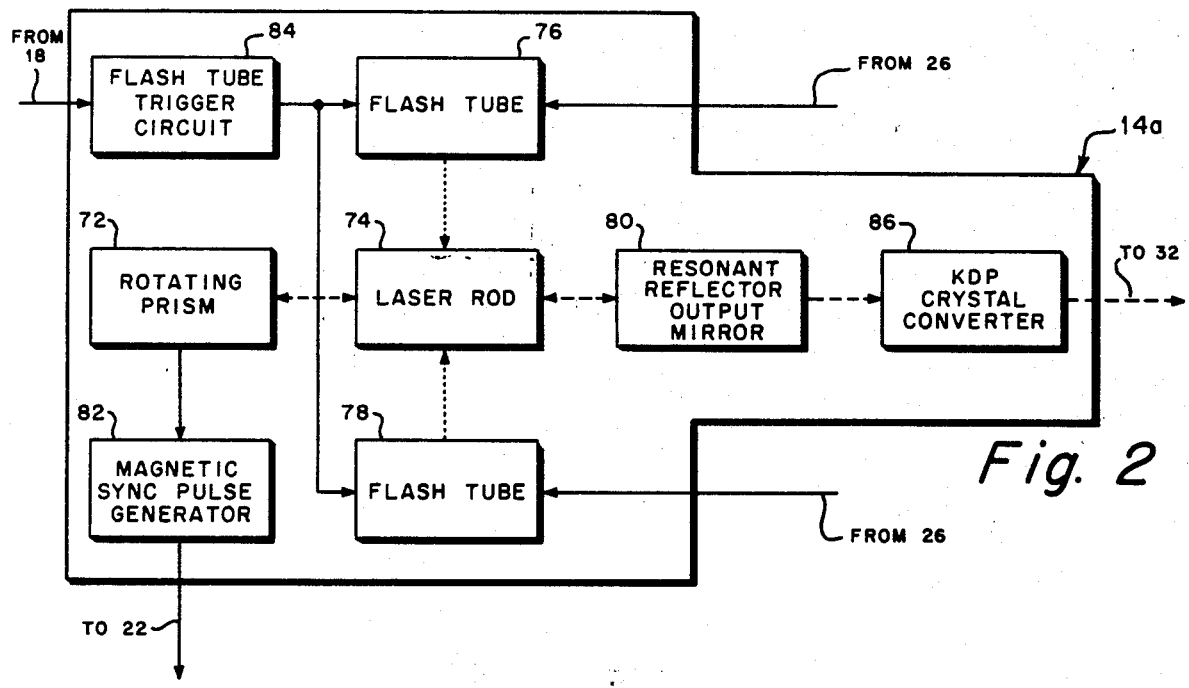
FIG. 2 is a section of the interference filter taken on the line 2—2 of FIG. 4 looking in the direction of the arrows.

Referring now to FIGS. 1 and 2, the interference filter will be explained. The filter 104 has a mosaic-type construction and provides a large aperture, narrow band, filter for improvement of the signal-to-noise ratio of the receiver. The filter includes an annular-shaped four-vane spider member 122 having an annular-shaped aperture 122a at the center thereof which is supported by four radially extending vanes 122b, affixed to a peripheral flange 122c. The annular-shaped aperture 122a accommodates the coaxial placement of a photomultiplier detector 42 (as will be described with reference to FIG. 3). Four glass substrates 124a–124d, each covering a quarter section of the filter assembly are affixed to the peripheral flange 122c of the annular-shaped member 122 by four arcuately-shaped peripheral clamps 126a–126d, and four radial clamps 128a–128d. To provide equal distribution of pressure from the peripheral clamps onto the glass substrate, four arcuately-shaped pressure distribution rings 130a–130d are interposed along the periphery of and intermediate the glass substrates and the clamps. Cemented to each substrate are eight rectangular-shaped or partially rectangular-shaped interference filter segments 132a–132h in juxtaposed relationship. The seams formed by the adjacent mosaic interference filter segments are filled with an opaque silicone compound 134 which acts as a light seal. Each quarter section of the interference filter is position on the four-vaned spider such that the clear aperture formed by the vanes is in line with the outer edges of the filter. Segmented neoprene gaskets 136a–136d are positioned around the outer perimeter of the glass substrates 124a–124d, respectively, and segmented neoprene gaskets 138a–138d are positioned around the inner perimeter of the same glass substrates. Similarly, neoprene gaskets cover the other exposed sides of the substrates to prevent contact between the glass substrate and the supporting structure. The peripheral clamps 126a–126d and the radial clamps 128a–128d are secured to the peripheral flange 122c and the four vanes 122b, respectively, by hold down screws 142. The clamps in turn hold the glass substrates to the annular-shaped member by a plurality of screws 140 which pass through the peripheral and radial clamps and bear against the pressure distribution rings. By this clamping technique, even clamping pressure is provided for the glass substrates so that only compression stresses exist. Bending stresses are minimized by providing an accurately machined bearing surface on the annular-shaped spider member 122; the neoprene gaskets deform to accommodate any slight non-parallelisms. Any difference in thermal expansion rate between the glass and the spider assembly is compensated by allowing adequate clearances in the lateral direction and by the combined action of compressive stresses and gasket deformation in the vertical direction.

By selecting each interference filter segment for the desired filter characteristics, the resultant mosaic filter will have substantially the same characteristics as each of the individual filters. The particular mosaic filter described herein has a center wavelength of 5305 plus or minus 3 Angstroms and a bandwidth of 50 plus or minus 5 Angstroms with a transmission at the center wavelength of greater than 50%, thereby providing a narrow acceptance band while still maintaining a high percentage of transmission.

While the mosaic interference filter may be utilized in any optical system wherein it is desired to filter out noise, a typical (exemplary) use may be in combination with a laser detection and ranging system. The collecting optics of such a system are shown in FIG. 3.

Figure 3:
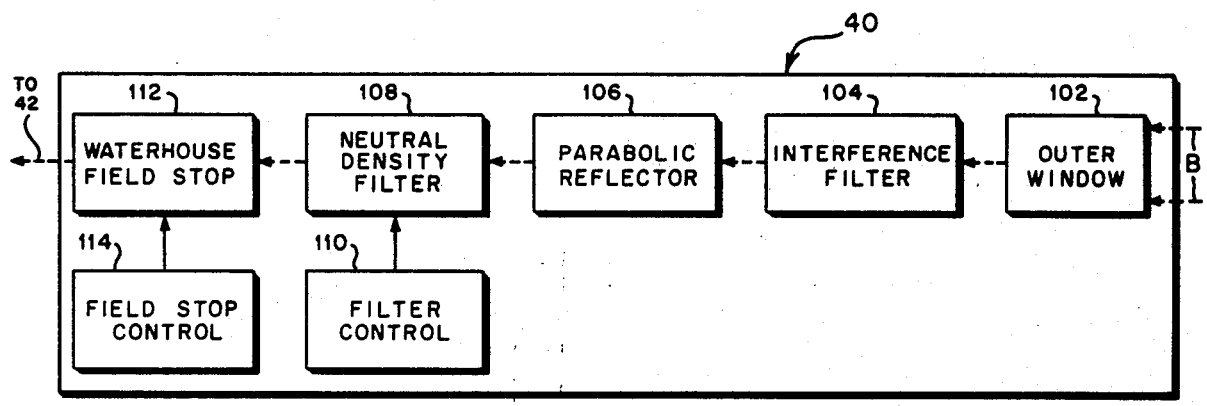
FIG. 3 is a diagrammatic side elevation view of the laser receiver.
Figure 8:
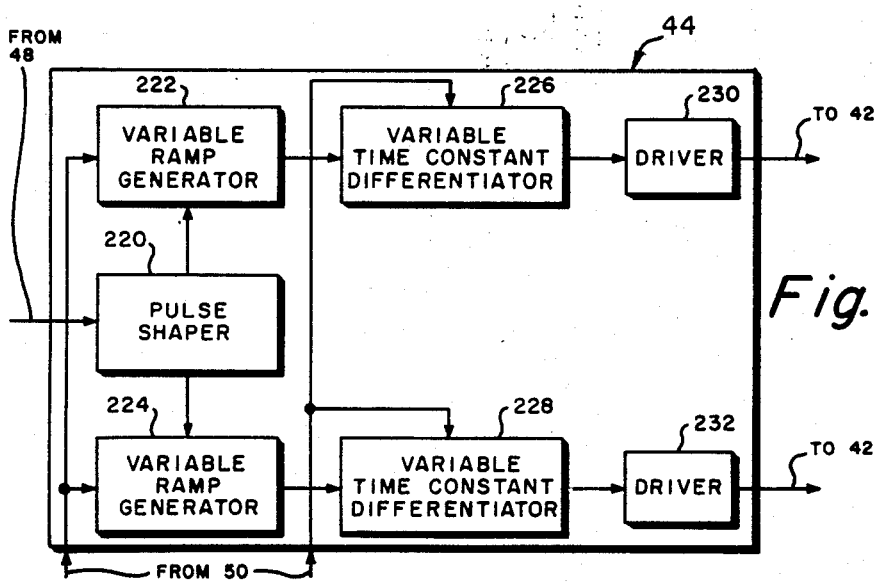

Referring now to FIG. 3, a diagrammatic view of a laser receiver is illustrated as having an outer protective window 102, through which incoming laser signals are received, positioned along the optical axis, A, of the receiver. The outer window is constructed in substantially the same manner as the interference filter 104 but for the lack of the mosaic filter segments and, accordingly, exhibits no filtering properties. The primary function of the outer window is to seal the sighting end of the receiver housing (not illustrated) from ambient conditions. Disposed along the optical axis, A, and supported at one end by the center aperture of the outer window 102, is the photomultiplier detector 42. The outer window 102 also supports a right angle prism 36 (not shown) so that the transmitted laser beam is co-linear with the receiver optical axis, A. The other end of the photomultiplier detector 42 is supported in the central aperture 122a of the intereference filter 104. Positioned at the far end of the receiver housing and forming a part thereof is a parabolic reflector 106. The particular reflector described herein has an f number of 0.4 and collects light energy passing through the outer window 102 and the interference filter 104 and focuses this energy at its focal plane. The path of the light energy entering the receiver is illustrated in FIG. 3 by the lines B.

Positioned in front of the focal plane of the parabolic reflector 106 is a neutral density filter 108, which as illustrated, is supported by a shaft 152 extending from a stepping motor (not shown). Positioned along the focal plane of the parabolic reflector 106 is a waterhouse field stop 112 which is supported by a shaft 154 concentric with shaft 152 and is driven by a second stepping motor (not shown). The stepping motors are controlled by means not shown. Light energy passing through the neutral density filter 108 and the waterhouse field stop 112 strikes the photosensitive cathode edge of the photomultiplier detector 42.

With reference to FIG. 3, it may first be assumed that a laser beam has issued from a laser head and has been directed by an optical system (not shown) toward a target. Positioned in the path of the laser beam may be provided a suitable beam splitter so that a portion of the laser beam is diverted into and detected by the photomultiplier detector 42 which converts the diverted beam into electrical energy. When the main laser beam strikes an object or target, laser energy reflections or echoes are returned to the receiver. Depending upon the reflective characteristics of the object and the range of the target, the magnitude of the received laser energy may vary over wide ranges. Accordingly, to provide a highly sensitive receiver, it is necessary to collect the received laser beam and focus it onto a detecting device. Thus, the reflected laser beam passes through the outer protective window 102 and impinges upon the mosaic interference filter 104. This filter operates as a bandpass filter with the center frequency thereof centered about the frequency of the transmitted laser beam. Therefore, the output of the filter is very narrow band, with much of the noise being eliminated. The output of the interference filter 104 strikes the parabolic reflector 106. The reflector 106 concentrates the received, and now filtered, laser signal at its focal plane.

The neutral density filter 108 and waterhouse field stop 112 are positioned one behind the other (as shown in FIG. 3) and located in the focal plane of the parabolic reflector 106. The neutral density filter 108 and field stop 112 are both multi-positional-type devices so that for a given set of environmental conditions, for example, a high brilliance environment, it is possible to set the filter density at a high level and reduce the field of view (i.e., the field stop) so that the background ambient energy level does not create a high noise level in the photomultiplier detector. The photomultiplier detector output may be connected to a range computer and display system which determines the range to the target by measuring time between the transmitted laser pulse (initially diverted by the beam splitter) and the output pulse from the photomultiplier detector indicative of the reflection. Also taken into account is the air resistance. In its simplest form, the display could be an A-scope.

In summary, the present invention provides an optical ranging and detection system for detecting underwater objects employing a novel laser transmitter and receiver, in which the receiver includes a novel interference filter, photomultiplier detector and sensitivity time control circuit.

Obviously many modifications and variations of the present invention are possible in light of the above teachings. It is, therefore, to be understood that within the scope of the appended claims, the invention may be practiced otherwise than as specifically described.

We claim:
1. An optical filter comprising:
    a plurality of filter segments of substantially the same filter characteristics in abutting relationship secured to a substrate and forming a mosaic pattern on said substrate with the space between said segments sealed with an opaque material, for providing a narrow band interference filter with a high percentage of transmission at a selected wavelength; and
    a supporting structure to which said substrate is secured by a substantially compressional force.
2. An optical filter as recited in claim 1 wherein said supporting structure has an aperture, the periphery of which provides support for said substrate.
3. An optical filter as recited in claim 2 further comprising:
    means for clamping said substrate to the periphery of said aperture.
4. An optical filter as recited in claim 3 wherein said supporting structure comprises:
    an annular shaped spider member having a plurality of apertures therein;
    a like plurality of substrates supported by said member, each substrate having a mosaic pattern of filter segments thereon, whereby said optical filter provides a high percentage of transmission in a narrow band centered about the selected wavelength.

* * * * *